United States Patent Office 3,577,537
Patented May 4, 1971

3,577,537
TOPICAL ADMINISTRATION OF VITAMIN B-12
Eugene E. Howe, Somerset, and Charles Rosenblum, Princeton, N.J., assignors to Merck & Co., Inc., Rahway, N.J.
No Drawing. Continuation-in-part of application Ser. No. 629,918, Apr. 11, 1967. This application Mar. 9, 1970, Ser. No. 17,897
Int. Cl. A61k 25/02
U.S. Cl. 424—201
4 Claims

ABSTRACT OF THE DISCLOSURE

Vitamin B-12 is administered to animals by topical application in a non-toxic solvent.

BACKGROUND OF THE INVENTION

This invention is concerned with a method of administering Vitamin B-12 to animals. This application is a continuation-in-part of U.S. Ser. No. 629,918, filed Apr. 11, 1967 now abandoned.

Vitamin B-12 is very difficultly absorbed from the gastrointestinal tract in spite of the fact that of all the essential nutrients, it alone has a known specific mechanism to facilitate its absorption. It has been reported that the vitamin is absorbed sublingually and by nasal inhalation, but neither of these methods is being used for the administration of Vitamin B-12. Generally, this vitamin is administered parenterally by subcutaneous or intramuscular injection.

SUMMARY OF THE INVENTION

It is one object of this invention to provide an improved method of administering Vitamin B-12 to animals which will avoid the difficulties and disadvantages of administering it parenterally.

Another object is to provide a method of administering Vitamin B-12 to animals whereby the vitamin is absorbed and slowly released.

In accordance with this invention, it is found that Vitamin B-12 can be administered to animals by applying a solution of the vitamin in a non-toxic solvent topically to the skin of the animal. The skin is found to act as a reservoir, absorbing large amounts of the vitamin and releasing it slowly to other tissues.

DESCRIPTION OF THE PREFERRED EMBODIMENTS

The vitamin B-12 can be applied topically to the skin in the form of a solution in suitable solvents which are non-toxic to the animal. Solvents suitable for this purpose that might be mentioned are organic solvents such as alcohols, for example, ethanol, water, and mixtures of these solvents. The concentration of the Vitamin B-12 in the solvent is not critical and can be varied depending upon the particular solvent. In general, it is found that solutions containing from 0.5 $\mu$g. to 1,000 $\mu$g. of Vitamin B-12 per ml. are satisfactory, although higher concentrations up to 10,000 $\mu$g. can be utilized if desired.

In carrying out the method of this invention, the solution of Vitamin B-12 is applied to the skin, whereupon the Vitamin B-12 is absorbed by the skin. The amount absorbed will vary somewhat, depending on the individual animal and the area upon which the solution of the vitamin is applied. The vitamin absorbed by the skin is slowly released to other tissues of the body, the skin thus acting as a depot or reservoir for the Vitamin B-12.

The following experiments carried out in rats and guinea pigs demonstrate the absorption of Vitamin B-12 by topical applications of solutions of the vitamins.

Experiments were performed to determine whether cyanocobalamin applied to the skin in water would stimulate growth of weanling rats consuming a Vitamin B-12 deficient diet. In these experiments, male rats of the Holtzman strain were separated into groups of 8, housed individually and allowed free access to food and water. The diet consisted of 60% soy bean meal, 23.9% glucose, 4% salt mixture, 10% partially hydrogenated fat, 2% cod liver oil, 0.1% thyroid powder, and a vitamin addendum lacking only Vitamin B-12. On such a diet it had previously been established that 0.1 $\mu$g. cyanocobalamin per rat per day usually produced a maximum growth response. On the assumption that only a small fraction of the topically applied vitamin would be absorbed, 5 $\mu$g. of cyanocobalamin in 0.03 ml. of water was applied daily in Experiment I (Table 1) to a 6 cm.$^2$ shaved area on the backs of the animals. They were weighed at 5-day intervals and finally at 28 days when they were sacrificed.

In Experiments II and III (Table 2) only 0.1 $\mu$g. of cyanocobalamin in 0.03 ml. of solution was applied to the rat, the experiments being identical in all other respects.

TABLE 1
Experiment I.—Effect of 5 $\mu$g. cyanocobalamin applied to skin on growth of weaning rats

| Diet | Average [1] 28-day weight gain±S.D. | P-value |
|---|---|---|
| Basal | 156±14.1 | |
| Basal plus 0.1 thyroid powder | 134±23.8 | |
| Basal plus 0.1 thyroid powder plus 10 $\mu$g. cyanocobalamin/kg. diet | 182±36.2 | 0.01 |
| Basal plus 0.1 thyroid powder plus 5 $\mu$g. cyanocobalamin in 0.03 ml. HOH applied topically | 185±17.0 | 0.01 |

[1] Eight rats per group.

TABLE 2
Effect of 0.1 $\mu$g. cyanocobalamin applied to skin on growth of weaning rats

| | Average [1] 28-day weight gain±S.D. | | P-value | |
|---|---|---|---|---|
| Experiment | II | III | II | III |
| Diet: | | | | |
| Basal plus 0.1 thyroid powder | 139±19.4 | 116±22.3 | | |
| Basal plus 0.1 thyroid powder plus 0.1 $\mu$g. cyanocobalamin in 0.03 ml. HOH applied topically | 160±9.9 | 142±22.7 | | 0.05 |
| Basal plus 0.1 thyroid powder Plus 0.1 $\mu$g. cyanocobalamin administered subcutaneously in aqueous solution | 165±15.5 | 162±21.2 | 0.05 | 0.01 |
| Basal plus 0.1 thyroid powder Plus 10 $\mu$g. cyanocobalamin/kg. of diet | 152±31.8 | 164±12.8 | | 0.01 |

[1] Eight rats per group.

The average 28-day weight gains of the growth Experiments I–III are shown in Tables 1 and 2 together with standard deviation (S.D.). Also reported are probability (P) values of differences, based on comparisons with basal diet+0.1 thyroid powder, calculated by the method of analysis of variance. Growth responses obtained (Table 2) with daily topical application of 5 μg. of cyanocobalamin were significant (P=0.01) and equivalent to ad libitum feeding of 10 μg./kg. diet. Even the low dose of 0.1 μg. per day when applied topically to the skin caused a maximum growth response.

In order to quantitate the effect more accurately, experiments were performed using Vitamin B–12 $^{57}$Co. In Experiment IV absorption from water and ethanol was measured using two concentrations, 0.025 μg. and 2.5 μg. cyanocobalamin in 0.03 ml. of solution, and two contact periods, 2 and 5 days. The solutions, each containing several tenths of a microcurie of radioactivity per dose, were applied to a 6 cm.$^2$ shaved area on the backs of male Holtzman rats weighing about 200 gm. and the applied areas were covered by gauze bandages held in place by adhesive tape circling the bodies of the animals. The rats were housed individually in metabolism cages to permit the collection of urine and feces, and were allowed unrestricted access to laboratory chow and water. After the designated time, they were sacrificed, the skin was excised from the area of application, and the bandage and skin section were washed with portions of detergent solution. Combined skin and bandage washings were diluted to 100 ml. with water, as were urine samples, and the fecal samples were suspended in 100 ml. water for assay. All radiometric measurements were made by gamma-ray scintillation counting. Urine, feces, washings and whole carcasses were measured in a Tobor large volume counter, while the washed skin samples were measured in the Autogamma instrument for small volume.

Group average absorption results as "Percent of Dose" of Experiment IV are recorded in Table 3. These data show absorption from the 2 vehicles but that absorption from ethanol is definitely superior to that from water. The apparent lower total absorption observed at 5 days as compared to 2 days is probably due in most part to variations between animals as witness the high incidence of large S.D. values. Such variability is not encountered frequently in later experiments. This may also be due to variable retention of vitamin by the bandage.

In rat Experiment V absorption of cyanocobalamin from ethanolic solution was compared at 4 concentrations (0.025, 0.25, 2.5 and 25 μg./0.03 ml.) at 3 contact times: 2 hours, 2 days, and 5 days.

TABLE 4

Experiment V.—Effect of concentration and time on percutaneous absorption by the rat of cyanocobalamin applied in $^{-57}$Co ethanolic solution

| Concentration, μg. | Duration | Average [1] percent of dose±S.D. | | | | Total absorption | |
|---|---|---|---|---|---|---|---|
| | | Skin | Urine | Feces | Carcass | Percent of dose | Equivalent, μg. |
| 0.025 | 2 hours | 14.8±6.3 | | | 1.15±1.53 | 15.9±5.78 | 0.0040±0.0015 |
| 0.25 | do | 8.3±2.3 | | | 0.10±0.04 | 8.4±2.28 | 0.021±0.006 |
| 2.5 | do | 8.2±1.6 | | | 0.22±0.04 | 8.4±1.54 | 0.21±0.04 |
| 25 | do | 9.1±2.2 | | | 1.20±1.20 | 10.3±1.87 | 2.6±0.47 |
| 0.025 | 3 days | 19.4±10.6 | 0.14±0.07 | 0.77±0.51 | 2.49±1.17 | 22.8±11.28 | 0.0057±0.0028 |
| 0.25 | do | 3.5±1.7 | 0.12±0.07 | 0.16±0.11 | 0.43±0.20 | 4.2±1.78 | 0.01±0.004 |
| 2.5 | do | 7.7±2.5 | 0.22±0.24 | 0.58±0.54 | 1.43±0.91 | 9.9±3.50 | 0.25±0.09 |
| 25 | do | 5.0±2.0 | 0.19±0.11 | 1.04±0.30 | 2.88±1.99 | 9.1±3.85 | 2.3±0.97 |
| 0.025 | 5 days | 27.5±5.3 | 0.31±0.53 | 1.83±2.90 | 2.57±3.57 | 32.2±12.06 | 0.0080±0.0030 |
| 0.25 | do | 9.9±5.3 | 1.49±1.56 | 4.62±4.64 | 4.51±1.48 | 20.4±6.61 | 0.056±0.018 |
| 2.5 | do | 13.0±5.1 | 0.82±0.72 | 2.84±2.34 | 5.1±4.66 | 21.7±10.46 | 0.54±0.26 |
| 25 | do | 18.5±7.8 | 0.31±0.17 | 4.49±3.45 | 3.46±1.37 | 26.8±10.31 | 6.7±2.58 |

[1] Four rats per group.

The data obtained in the performance of Experiment V are compiled in Table 4 and show that the dose-response (total absorption) curves are approximately of a log-log type, characteristic of an absorption process. This is true of all 3 time intervals studied and the slopes of the log-log curves are about equal. Initial absorption is rapid and remains essentially constant between 2 hours and 2 days, but increases approximately 2.5-fold between 2 and 5 days. Individual absorption is quite variable, but under the conditions of the experiment does not appear to be a function of the quantity of the vitamin applied.

Experiment VI was designed to investigate the role of the skin as a depot or reservoir of Vitamin B–12 after topical application. Four groups of 5 rats each were treated as previously described with 0.03 ml. of ethanolic solution containing 2.5 μg. of radioactive cyanocobalamin. The animals were sacrificed at 5, 10, 19 and 40 days and the appropriate measurements made. Urine and feces of all surviving animals were collected daily. The results of this experiment are shown in Table 5.

TABLE 3

Experiment IV.—Effect of solvent on percutaneous absorption of cyanocobalamin $^{57}$Co in the rat

| Application | | | Average [1] percent of dose±S.D. | | | | |
|---|---|---|---|---|---|---|---|
| μg. vit. B–12 | Vehicle | Days | Skin | Carcass | Urine | Feces | Total absorption |
| 0.025 | H₂O | 2 | 2.23±0.56 | 3.02±5.42 | 0.06±0.04 | 0.57±1.21 | 5.87±6.16 |
| | | 5 | 2.27±0.88 | 0.19±0.07 | 0.06±0.05 | 0.13±0.03 | 2.65±0.94 |
| 0.021 | EtOH | 2 | 35.3±12.3 | 0.56±0.28 | 0.04±0.03 | 0.10±0.04 | 36.0±12.53 |
| | | 5 | 21.6±10.7 | 0.80±0.38 | 0.08±0.06 | 0.20±0.08 | 22.7±10.78 |
| 2.5 | H₂O | 2 | 7.0±3.3 | 5.95±3.63 | 0.04±0.03 | 1.38±1.46 | 14.4±6.64 |
| | | 5 | 8.53±4.0 | 0.40±0.29 | 0.05±0.05 | 0.21±0.11 | 9.2±4.30 |
| 2.1 | EtOH | 2 | 20.7±7.7 | 0.51±0.58 | 0.03±0.02 | 0.13±0.17 | 21.4±8.16 |
| | | 5 | 29.3±7.6 | 2.69±1.87 | 0.16±0.10 | 2.39±2.60 | 34.6±11.09 |

[1] Six rats per group.

TABLE 5

Experiment VI.—Percutaneous absorption of cyanocobalamin $-^{57}$Co (2.5 μg.) showing depot effect

| Average[1] percent of dose±S.D. | Duration of experiment, days | | | |
|---|---|---|---|---|
| | 5 | 10 | 19 | 40 |
| Urine and feces: | | | | |
| Day 1-5 | 0.09±0.03 | 0.08±0.04 | 0.17±0.10 | 0.06±0.05 |
| Day 5-10 | | 0.54±0.80 | 0.33±0.13 | 0.28±0.37 |
| Day 10-14 | | | 0.44±0.39 | 1.28±1.78 |
| Day 14-19 | | | 0.41±0.33 | 1.50±1.86 |
| Day 19-24 | | | | 0.96±0.94 |
| Day 24-28 | | | | 0.77±0.59 |
| Day 28-34 | | | | 0.77±0.67 |
| Day 34-40 | | | | 0.65±0.56 |
| Total | 0.09±0.03 | 0.62±0.81 | 1.35±0.76 | 6.25±6.15 |
| Skin | 26.0±4.9 | 19.1±11.8 | 3.66±1.60 | 3.26±4.11 |
| Carcass | 0.62±0.25 | 1.01±1.04 | 1.19±0.67 | 3.19±1.60 |
| Wash plus bandage | 65.8±8.1 | 75.9±13.2 | 87.8±4.8 | 79.4±10.28 |
| Total | 92.5±5.9 | 96.6±5.8 | 94.1±4.7 | 92.1±5.2 |

[1] Five rats per group.

Table 5 is a compilation of group average values obtained in Experiment VI again expressed as "Percent of Dose." It is clear from these figures that the skin acts as a storage depot for Vitamin B-12, gradually releasing the vitamin for use in other body tissues. This is shown by: (1) the gradual decrease in skin radioactivity with time, by (2) the concomitant rise in carcass activity, and by (3) the continuous elimination of radioactivity in urine plus feces. Thus, increases in elimination of radioactivity in excreta and increases in carcass concentrations occur at the expense of a parallel decrease in skin radioactivity. Excretion during the first 5 days is negligible, but increases thereafter to reach a maximum in about 20 days and is still quite high 40 days after topical application. Animals vary considerably in the permeability and retentivity of their skin to radioactive Vitamin B-12. In many cases, hgh skin retentivity is accompanied by low urinary output.

The purpose of the seventh and final experiment was to show that the observed absorptive process is not peculiar to the rat. Ten female guinea pigs of approximately 300 gm. in weight were subjected to experimental procedures similar in all details to those of Experiment VI with the following exceptions. One animal died on the sixth day and was examined at the time of death, 4 were sacrificed on the 13th day, and the remaining 5 were sacrificed on the 24th day.

The results of Experiment VII are summarized in Table 6. Despite great variability between animals, the carcass and excreta activities of the guinea pig rise at the expense of a diminishing skin radioactivity, just as was observed with the rat. This behavior indicates that the skin of the guinea pig also serves as a depot source for Vitamin B-12. Values for skin plus bandage washings are recorded in Tables 5 and 6 as an indication of the radioactivity accountability achieved in these experiments. Although somewhat variable, an average of 96% of the activity is accounted for.

TABLE 6

Experiment VII.—Percutaneous absorption of cyanocobalamin $-^{57}$Co (2.5 μg.) from ethanol solution by the guinea pig as percent of dose

| Guinea pig number | Percent of dose | | | | | |
|---|---|---|---|---|---|---|
| | Skin | Carcass | U plus F | Total retention[1] | Wash plus bandage | Total |
| 10[2] | 7.1 | 0.17 | 0.07 | 7.4 | 87.4 | 94.8 |
| 1[3] | 13.2 | 0.40 | 0.15 | 13.8 | 83.6 | 97.4 |
| 2 | 6.7 | 0.51 | 0.18 | 7.4 | 91.6 | 99.0 |
| 3 | 4.61 | 2.47 | 2.07 | 9.1 | 90.1 | 99.2 |
| 4 | 17.9 | 0.73 | 0.25 | 18.9 | 92.6 | 111.5 |
| Average±S.D. | 10.6±6.1 | 1.03±0.97 | 0.66±0.94 | 12.3±5.17 | 89.5±4.05 | 101.8±6.53 |
| 5[4] | 5.62 | 4.84 | 9.7 | 20.2 | 77.5 | 97.7 |
| 6 | 1.29 | 2.25 | 3.41 | 6.95 | 86.5 | 93.5 |
| 7 | 2.43 | 0.57 | 0.18 | 3.18 | 96.0 | 99.2 |
| 8 | 1.20 | 0.99 | 0.34 | 2.53 | 101.8 | 104.3 |
| 9 | 2.32 | 0.73 | 0.26 | 3.31 | 98.7 | 102.0 |
| Average±S.D. | 2.57±1.80 | 1.88±1.78 | 2.78±4.10 | 7.2±7.45 | 92.1±9.97 | 99.3±4.14 |

[1] Sum of skin, carcass and U plus F values.
[2] Died on 6th day.
[3] Numbers 1-4 sacrificed on 13th day.
[4] Numbers 5-9 sacrificed on 24th day.

What is claimed is:

1. A method of administering a therapeutic amount of Vitamin B-12 to animals which comprises applying a solution of Vitamin B-12 in a non-toxic liquid solvent to the skin of said animal.

2. The method of claim 1 wherein the solvent is water.

3. The method of claim 1 wherein the solvent is a non-toxic alcohol.

4. The method of claim 1 wherein the solvent is ethanol.

References Cited

Schaeler et al. JL. Nutr. 59(2):171-179, June 1956, "Absorption of Topically Applied Vitamins."

Okuda et al. Proc. Soc. Exp. Biol. Med. 123(2):504-506, November 1966, "Absorption of Vitamin $B_{12}$ in a Rectal Suppository."

SHEP K. ROSE, Primary Examiner